United States Patent [19]

Daher et al.

[11] Patent Number: 4,738,857

[45] Date of Patent: Apr. 19, 1988

[54] SHELF STABLE PLASTIC PACKAGED ALCOHOLIC BEVERAGE CONTAINING ESSENTIAL OILS

[75] Inventors: James Daher, Avon; Robert S. Ashmont, Farmington; Thomas C. Bibeau, Windsor; Carlos D. Chiriboga, East Grandy; Gerhard Thiessen, Farmington, all of Conn.

[73] Assignee: Heublein, Inc., Farmington, Conn.

[21] Appl. No.: 889,434

[22] Filed: Jul. 25, 1986

[51] Int. Cl.$^4$ .............................. A23L 2/00; C12G 3/00
[52] U.S. Cl. .................................. 426/106; 426/592; 426/599
[58] Field of Search ............... 426/106, 126, 127, 131, 426/415, 398, 592, 599; 215/1 C

[56] References Cited

U.S. PATENT DOCUMENTS

| | | | |
|---|---|---|---|
| 3,647,472 | 3/1972 | Speech et al. | 426/592 |
| 3,715,895 | 2/1973 | Devlin | 62/457 |
| 3,897,571 | 7/1975 | Homler et al. | 426/592 |
| 4,008,347 | 2/1977 | Amberg et al. | 428/35 |
| 4,139,655 | 2/1977 | Herrero | 428/35 |
| 4,355,721 | 10/1982 | Knott, II et al. | 206/524.2 |
| 4,429,079 | 1/1984 | Shibata et al. | 525/240 |
| 4,468,812 | 8/1984 | Grosvenor | 426/127 |
| 4,491,598 | 1/1985 | Hsu et al. | 426/127 |
| 4,503,102 | 3/1985 | Mollison | 428/35 |
| 4,513,036 | 4/1985 | Thompson et al. | 428/35 |
| 4,529,606 | 7/1985 | Foster et al. | 426/106 |
| 4,610,366 | 9/1986 | Ester et al. | 215/1 C |

OTHER PUBLICATIONS

Ace et al. 1977 Winemaking as a Hobby, Pennsylvania State University, p. 55.
"Packaging", Feb. 1986, p. 19.
Moore, G. D., "Bottles, Plastic, Co-Extruded, Multi-Layer, High-Barrier; Packaging Reference Issue 1986, pp. 123-126.
DeLassus, Philip T., "Transport of Unusual Molecules in Polymer Films"; TAPPI Proceedings, 1986, Polymers, Laminations and Coatings Conference, Book 2, pp.445-449.
Abstract of Ind. Bevande. vol. 14, No. 77, Jun. 1985, p. 291.

Primary Examiner—Raymond N. Jones
Assistant Examiner—Carolyn Paden
Attorney, Agent, or Firm—McCormick, Paulding and Huber

[57] ABSTRACT

A plastic packaged alcoholic beverage containing essential oils and having a substantial shelf life is provided. The alcoholic beverage has a proof of at least about 10 and includes as an essential taste component one or more essential oils. The alcoholic beverage is packaged in a container which includes as an interior layer in contact with the alcoholic beverage, a polypropylene homopolymer, and a second layer exterior to the interior layer comprising an oxygen barrier polymer. The packaged alcoholic beverage of the invention has a shelf life under standard conditions of at least about one year such that the alcoholic beverage has substantially uniform taste throughout the shelf life.

16 Claims, No Drawings

SHELF STABLE PLASTIC PACKAGED ALCOHOLIC BEVERAGE CONTAINING ESSENTIAL OILS

FIELD OF THE INVENTION

The invention relates to a packaged alcoholic beverage containing essential oil which has a prolonged shelf life. More specifically, the invention relates to a ready-to-drink alcoholic beverage containing essential oil, packaged in a plastic container and which can be of a single serving size and having a prolonged shelf stability of up to one year.

DESCRIPTION OF RELATED ART

Alcoholic based beverages containing essential oils, i.e., margaritas, daiquiris, screwdrivers, mai-tai's, sours, and the like, have been marketed to consumers in individual serving sizes in glass and metal containers. Recently, certain forms of essentially pure spirits, such as vodka, have been marketed in polyethylene terephthalate (PET) containers. More recently, wine has been marketed overseas in individual serving size polypropylene plastic containers.

The packaging of various alcoholic spirits and beverages in plastic containers is accomplished with varying degrees of difficulty. For example, although some vodkas can be packaged in PET, PET is not suitable for packaging of other beverages which are oxygen sensitive. In the packaging of wine, the essential consideration in choosing a container is oxygen permeability. Alcoholic beverages in ready-to-drink form which contain essential oils involve a number of other problems. Such ready-to-drink cocktails can be expected to remain on store shelves for longer time periods, in some cases, up to a year or longer. The components of the cocktail, and particularly the essential oils, are known to be susceptible to degradation when exposed to even small levels of oxygen. Moreover, various materials previously used in packaging of other products are susceptible to attack by the essential oils or the oils in combination with alcohol. And minute quantities of materials dissolved or suspended in packaging materials may be leached out by alcohol. Additionally, essential oils can be and are readily absorbed by known plastic packaging materials. Because of these various difficulties, alcoholic mixed drinks containing essential oils have not prior to this invention been marketed to consumers in plastic containers.

The propensity of essential oils to interact with plastic materials used for food packaging is an art-recognized problem. DeLassus, P. T.; Transport of Unusual Molecules in Polymer Films; TAPPI Proceedings, 1985, Polymers, Laminations and Coating Conference, Book II, pp. 445-449, discusses in detail two of the known negative interactions between plastic packages and essential oils; permeation and sorption. It is reported that d-limonene interacts through both of these mechanisms with numerous polymer films including low density polyethylene, high density polyethylene and oriented polypropylene. Both permeation and sorption are time and temperature dependent and are greatly influenced by the surface area of the container relative to the volume of liquid contained in the container. For both thin and thick walled plastic containers, it is reported that the art expects d-limonene to be rapidly removed from orange juice by polyolefins. The authors conclude that both sorption and permeation losses can be greatly reduced by adding a barrier layer of Saran, i.e., polyvinylidenechloride, film at the interior of the container.

As indicated, the problem of essential oil permeation and sorption is most apparent in small serving packages, i.e., one liter or less, since the container surface area is large in relation to package volume. This problem has been overcome somewhat in connection with artificial citrus drinks by including excess essential oils in the drinks. However, the taste of the drink can be expected to change over time due to essential oil loss.

U.S. Pat. No. 4,513,036, Thompson et al, is directed to a barrier laminate for containment of essential oils and flavors and to cartons made from the barrier laminate. According to the disclosure of this patent, a polypropylene layer can act as a barrier to the migration of essential oils and/or flavors. The polypropylene may be a homopolymer or may be copolymerized with up to 25% of another olefin copolymer. Orange juice cartons prepared according to the patent with the structure (from the outside to the inside) polyethylene/paperboard/polypropylene/polyethylene when used to package orange juice for six weeks, resulted in a 39.5% loss of essential oils and 71% loss of vitamin C. Similarly, the patent discloses that a structure similar to the above but substituting aluminum foil for the polypropylene resulted in a 35.5% loss of essential oils and a 24% loss of vitamin C from orange juice after a storage period of six weeks.

As indicated, in addition to the essential oil problem are the problems related to alcohol interaction with the interior of the container. Such problems may involve alcohol attack on the interior of the container. Other interactions may involve leaching by the alcohol of components from the interior of the container. Relatively pure white spirits such as vodka have been marketed in polyethylene terephthalate bottles. However, it is recognized that such PET bottles would not be suitable for preparing a shelf stable packaged alcoholic beverage containing essential oils because such containers are permeable to oxygen. Recently, individual serving size polypropylene containers have been used to market wine overseas. However, wine does not contain essential oils and thus choice of a suitable container does not involve consideration of the essential oil problem.

The stability of various plastics to alcohol is reported in THE PACKAGING REFERENCE ISSUE 1986, pp. 123–126. For example, low density polyethylene is said to have stability to alcohol ranging from "fair to very good". Likewise, PVC is said to have a stability to alcohol ranging from "good to very good". Nevertheless, when these materials are used to package alcoholic beverages, taste panels can detect minute quantities of contaminants in the beverage after long-term storage. In this regard, although alcoholic beverages may be tested by sensitive analytic techniques, it is well recognized that the ultimate test is organoleptic. And it is generally recognized that organoleptic testing can detect contaminants at levels lower than detectable by analytical instrumentation.

Accordingly, even though plastic packaging has long been available and even though it has been long desirable to market alcoholic cocktails in plastic packaging, prior to this invention alcoholic beverages with extended shelf stability containing essential oils have not been available in plastic packaging. It would be highly desirable to provide a plastic packaged alcoholic beverage containing essential oils in a size which can be small, for example one liter or less, where the beverage maintains a substantially uniform and uncontaminated taste for periods up to one year or longer. It would be highly desirable if such a plastic packaged alcoholic beverage were comparable to a glass packaged alcoholic beverage for periods of up to one year.

SUMMARY OF THE INVENTION

Following extensive experimentation, a plastic packaged alcoholic beverage containing essential oils is provided. The plastic packaged alcoholic beverage containing essential oils is comparable to the same beverage packaged in glass. But the plastic container is inexpensive and readily available. The packaged alcoholic beverage of the invention comprises a sealed container containing an alcoholic beverage. The alcoholic beverage has a proof of at least about 8 and includes as an essential taste component one or more essential oils, such as citrus essential oils, which are present in an amount sufficient to perceptibly enhance the flavor of the beverage. The container includes an interior layer in contact with the alcoholic beverage and a second layer. The interior layer consists essentially of polypropylene homopolymer. The second layer is located exterior to the inside layer and is composed of an oxygen barrier polymer. The packaged alcoholic beverage of the invention has a shelf life of at least about one year such that the alcoholic beverage has substantially uniform taste throughout the one year shelf life.

In various advantageous embodiments of the invention, the alcoholic beverage can also contain substantial amounts of citric acid, sugars and other flavorings. The container preferably has at least one other layer exterior to the oxygen barrier layer, which can be composed of a polyolefin, for example, polypropylene. The container can be provided in sizes of one liter or less, for example as a single serving cup sealed with a peelable lidding.

The containers useful in the combination of this invention are made from inexpensive polymers and can be provided by known technology. The containers thus do not add substantial cost to the packaged alcoholic product of the invention. The invention is particularly useful in connection with the alcoholic soft ice composition described in U.S. application Ser. No. 925,441, filed on 10/31/86, and entitled ALCOHOLIC SOFT ICE COMPOSITION When the latter product is provided in plastic packaged form according to this invention, concerns regarding container integrity in the freezer environment are substantially eliminated.

DETAILED DESCRIPTION OF THE INVENTION

Packaged alcoholic beverages of the invention include any of various mixed drinks or cocktails which contain essential oils to perceptibly enhance or affect the overall flavor of the beverage. Typical of these cocktails and mixed drinks are margaritas, daiquiris, screwdrivers, mai-tai's and sours. Essential oils are a necessary and essential ingredient in such mixed drinks in order to provide the characteristic flavor associated with the drink.

It will be apparent that the terms "alcoholic" and "alcohol" as used herein, refer to ethyl alcohol, the well-known alcohol employed in alcoholic beverages. A typical packaged alcoholic beverage of this invention will have a proof of from about 15 to about 30, and thus an alcoholic content of between about 7 and about 15.

However, alcoholic proof can range from as low as about 8 to as high as about 40, this being the proof range for alcoholic mixed drinks marketed in ready-to-drink form.

The packaged alcoholic beverage can contain any of the various well-known essential oils. Essential oils are known to those skilled in the art as the natural (or synthentic equivalent of) volatile materials isolated from various odorous plants by physical processes, typically distillation such as steam distillation; and/or solvent extraction. Essential oils are soluble in alcohol or ether and can contain hydrocarbons, alcohols, phenols, ethers, aldehydes, ketones, acids and esters. The synthetic essential oils contain components prepared by chemical synthesis often in combination with other substances obtained from natural essential oils. Essential oils which are a component of the packaged alcoholic beverages of the invention include, for example, cinnamon oil, peppermint oil, ginger oil, grapefruit oil, lemon oil, lime oil, mandarin orange oil, bitter orange oil, sweet orange oil, orris root oil, and the like. In preferred embodiments of the invention, the packaged alcoholic beverage will be based primarily on a citrus essential oil, i.e., lime, lemon, orange, grapefruit, mandarin or the like.

The essential oil will be present in beverages within the scope of the invention as an essential flavor component and in an amount sufficient to perceptibly enhance or affect the flavor of the beverage. That is, sufficient essential oil will be present to readily and obviously influence the organoleptic impact perceived by the consumer. It will be apparent that a properly designed taste panel can readily determine whether one or more essential oils are present in such an amount by comparing the same beverage with and without the essential oil content.

The essential oil will be present in an amount up to about 2.0% by weight, typically less than 1.0% by weight, more typically less than 0.1% by weight. One particularly attractive feature of the invention is that the essential oil content of the alcoholic beverage at packaging can be precisely as designed or engineered. This is in contrast to typical plastic-packaged beverages of the prior art such as orange drinks, lemon or lime drinks wherein an excess of essential oil is added to the drink based on expectations that essential oil will be absorbed by the interior surface of the plastic package, thus decreasing the organoleptic impact of the essential oil. With the plastic packaged alcoholic beverages of this invention, the amount of essential oil added to the beverage is exactly that amount desired to be present when the drink is ultimately consumed, even though the drink may be consumed as much as a year after packaging. Surprisingly, this is true even when only small amounts of essential oil, e.g. 0.5% or less by volume, are used, and only a minor interaction with packaging would be expected to remove or destroy the small content of essential oil. Although the mechanisms and/or reasons are not precisely understood, it has been found that alcoholic beverages when packaged according to this invention maintain a substantially uniform taste, as evaluated by taste panels, for a standard condition shelf life of a year or greater, even though the literature tends to indicate that the polymer packaging materials used herein would be expected to absorb essential oils.

In addition to alcohol and essential oils, the packaged beverages of the invention can also contain other ingredients, preferably including organic acids such as citric acid, maleic acid, fumaric acid, tartaric acid, and the like and/or sugars such as dextrose, sucrose, fructose or corn syrups containing sugars.

A preferred packaged beverage according to this invention will include the combination of citrus essential oil and citric acid wherein the citric acid is present in an amount of between 0.5 to 2.0% by weight, preferably 0.75 to 1.5% by weight. It will be recognized that such preferred beverage presents a combination of difficulties for packaging including in combination, alcohol, essential oil and acidity, each of which can, alone and in combination affect the packaging.

The construction of the container used in the invention is critical. The container's interior layer which contacts the alcoholic beverage is essentially pure polypropylene homopolymer. Fillers, additives and the like which would affect the inert character of the polypropylene homopolymer (with respect to the packaged alcoholic beverage), or which might absorb essential oils, must not be included in the interior polypropylene layer. Preferably, the interior polypropylene layer will have the degree of orientation and crystallinity as would be inherently imparted to polypropylene containers when prepared according to well-known vacuum thermoforming processes. Thickness of the polypropylene interior layer is preferably small, i.e., 0.025 in. or less, more preferably 0.015 in. or less, even more preferaby 0.010 in. or less, for example between 0.001 and 0.005 in.

Additionally, it is critical that the container have an oxygen barrier plastic layer located exterior to the polypropylene interior layer. Preferably the oxygen barrier layer is located adjacent the polypropylene interior layer, however, if desired other layers may be located between the barrier layer and the polypropylene interior layer. The preferred oxygen barrier layer is ethylene vinyl alcohol copolymer which is known to provide superior oxygen impermeability. Extrudable grades of ethylene vinyl alcohol copolymer are available under the name EVAL from Kuraray Co., Ltd. of Japan. Other oxygen barrier materials such as are known to those skilled in the art, for example, Saran, nylon and polyacrylonitrile may be used herein. But it will be recognized that layer thickness and other specifications may need to be modified in order to provide an oxygen barrier layer equivalent to a very thin layer of ethylene vinyl alcohol copolymer. Bonding of the barrier layer, such as ethylene vinyl alcohol copolymer to the inside polypropylene layer can be effected by any of various means known to those skilled in the art. Typically, a suitable adherent for joining polypropylene to ethylene vinyl alcohol copolymer such as acid anhydride grafted polyolefin can be used. Other suitable adherents are known to those skilled in the art.

Preferably, the container will also have a layer exterior to the oxygen barrier layer since materials such as ethylene vinyl alcohol copolymer have little strength. Various thermoplastics such as PET, polyolefin homopolymers and copolymers, nylon or the like are advantageously used as the exterior layer. A preferred exterior layer is a polyolefin such as polypropylene because of its low cost, structural integrity and the like. Additionally other layers can be included to improve physical properties such as impact strength. Polyolefin copolymers can be used in various layers, for example, as a layer located between exterior and interior layers, or as the exterior layer in this regard. Containers useful in the present invention thus can have for example five or seven layers as follows (from exterior to interior): polyolefin (preferably polypropylene homopolymer or copolymer)/adhesive/EVOH/adhesive/polypropylene homopolymer; or polyolefin (preferably polypropylene homopolymer or copolymer)/adhesive/regrind/adhesive/EVOH/adhesive/regrind/adhesive/polypropylene homopolymer. "Regrind" refers to scrap which has been ground and reused. Thus, regrind contains a mixture of the materials used in all of the layers. Additionally, it will be recognized that other thermoplastics could be substituted for the regrind in the latter structure.

Containers made from these structures are preferably prepared by inexpensive vacuum thermoforming techniques known to those skilled in the art. As indicated previously, such vacuum thermoforming techniques impart desirable orientation and crystallinity to the interior polypropylene layer. The sheet used in the vacuum thermoforming step can advantageously be prepared by coextrusion. Suitable vacuum thermoformed containers having the structure indicated are commercially available from Rampart Packaging, Inc.

Advantageously, the container size and configuration can be one liter or less and can be in the shape of a cup and the top of the cup can be sealed with a lid or with a peelable lidding. It will be recognized that as with the interior of the plastic container, the interior of the lidding must be inert to the alcoholic beverage; i.e., it must not interact with the alcoholic beverage, otherwise, the taste characteristics of the alcoholic beverage will change over time. Thus, the interior surface of the lidding can be polypropylene homopolymer or copolymer or a coated metallic foil, such as aluminum. A preferred lidding is peelable and has the interior layer composed of an aluminum foil coated with an ultra thin lacquer coating of a MORPRIME adhesive, which is based on maleic anhyride grafted to polypropylene and will peelably adhere the foil to the plastic cup. Such adhesives in very small amounts are essentially inert to the alcoholic beverage.

The packaged alcoholic beverages of the invention are shelf stable at normal storage conditions for at least one year even when packaged in a size of one liter or less or in a single serving size. As used herein, "single serving size" is used to mean about 12 ounces or less, typically from four to eight ounces. One year stability is determined by accelerated testing as follows. The sealed container is held at 100° F. for three months and then the contents compared by a taste panel to a standard. If an uncontaminated taste is found which is substantially identical to the standard, the product passes the test.

As indicated previously the packaged alcoholic beverages of the invention can comprise compositions which form a soft ice or slush when placed in a home freezer. The plastic packaging thus eliminates concerns regarding container integrity in the freezer environment.

The following examples serve to illustrate the invention and the best mode contemplated by the inventors for carrying out the invention. In these examples, various cocktail products were packaged in different plastic or plastic-lined containers. The containers were stored at 40° F., 70° F. and 100° F. and periodically the containers were opened and the contents sampled. At sampling, the taste of the packaged product was compared to a standard.

EXAMPLE 1

Mixed drinks with and without essential oils were packaged in single serving size aseptic laminated drink boxes having the construction (from outside to inside) paperboard/foil/low density polyethylene. The products tested were as follows:

Piña Colada at 30 proof (containing coconut oil for body but no essential oil as essential component of taste)

Daiquiri at 25 proof (containing essential oils as an essential taste component less than about 0.001% by volume)

Tequila Sunrise at 30 proof (containing essential oils comparable to Daiquiri levels)

Manhattan at 40 proof (containing no essential oils as essential taste component)

Strawberry Daiquiri (containing essential oil as essential taste component less than 0.001% by volume)

In addition to the ingredients noted above, the daiquiris and Tequila Sunrise also contained citric acid in an amount of about 1% by weight After one month storage at 70° F. and 100° F., all products but the Pina Colada failed the test. "Plastic Notes" were detected by the taste panel.

EXAMPLE 2

Example 1 was repeated with the same container. The cocktails tested were as follows:

Manhattan at 55 proof
Daiquiri at 30 proof

Both products were prepared with ingredients as per Example 1 with the exception of alcohol indicated above. After two months at 100° F., both products failed. "Plastic notes" were reported in tasting tests.

EXAMPLE 3

Example 1 was repeated with the same container. The drinks tested were as followed:

Margarita at 15 proof
Margarita at 18 proof

The margaritas contained essential oils as an essential taste component in an amount of between about 0.01 and 0.02% by volume, and citric acid in an amount of about 1% by weight.

After one month at 100° F., both products failed. "Plastic notes" were reported in the taste tests.

EXAMPLE 4

Example 1 was repeated. However, the container used was a thermoformed single serving polyethylene plastic cup sealed with a peelable lidding material. The products tested were as follows:

Margarita at 18 proof
Daiquiri at 18 proof
Piña Colada at 25 proof

The formulation of the drinks with the exception of alcohol was the same as in Examples 1 and 3. After three months, both the margarita and daiquiri failed at 70° F. and 100° F. The packaged Pina Colada was found acceptable at the end of the three month period. As can be seen from Example 1 and this example, the Pina Colada which does not contain essential oils is less susceptible to contamination and/or taste change than the products containing essential oils.

EXAMPLE 5

Example 1 was repeated. The container used was a multiple layer plastic cup prepared by vacuum thermoforming and having the construction from exterior to interior with percentages by weight: polypropylene(39.5%)/adhesive(5.5%)/EVOH(10.0%)/adhesive (5.5%)/polypropylene homopolymer(39.5%). The cup had a total wall thickness of from about 14 to about 18 mils (thousandths of an inch). The cups were sealed with a peelable lidding having an interior surface of aluminum foil bearing an ultra thin coating of MORPRIME adhesive (commercially available from Morton Chemicals Co. The cocktails tested were as follows:

Margarita at 18 proof
Daiquiri at 18 proof
Piña Colada at 25 proof

The mixed drinks had substantially the same compositions as in previous examples with the exception of the proof levels noted. After six months at 100° F., all the packaged drinks passed the taste test.

EXAMPLE 6

Example 5 was repeated with the same plastic cup and lidding material except that layers of "regrind" were included between each of the polypropylene layers and the EVOH layer. Thus the cup had seven layers. "Regrind" refers to scrap which has been ground and thus contains all of the materials found in each of the original layers. These cups had substantially the same thickness as the cups in Example 5. The lidding material used was the same as in Example 5. The mixed drinks tested were as follows:

Margarita at 18 proof
Daiquiri at 20 proof
Martini at 42 proof (containing no essential oils)

After six months at 100° F., all packaged products were found to be acceptable.

EXAMPLE 7

Example 5 was repeated using the same cup except that the interior and exterior layers were composed of polypropylene containing a small amount of another polyolefin as a copolymer. The copolymer had substantially the same chemical and physical properties as the homopolymer used in Examples 5 and 6 except that it exhibited a better cold temperature impact resistance. It was expected that this product would behave identically to the containers used in Examples 5 and 6. However, packaged margaritas and daiquiris failed at the end of sixty days. "Plastic notes" were detected.

EXAMPLE 8

An 18 proof margarita was prepared having the following composition:

| INGREDIENTS % (by weight) | 18° Proof MARGARITA |
| --- | --- |
| Spirits | TEQUILA & NEUTRAL SPIRITS |
| High Fructose Corn Syrup | |
| Dextrose (50%) | 10.8152–11.0961 |
| Fructose (42%) | 9.0848–9.3207 |
| Maltose (1.5%) | 0.3245–0.3329 |
| Isomaltose (1.5%) | 0.3245–0.3329 |
| Higher Saccharides (5.0%) | 1.0815–1.1096 |
| Dry Basis (Total) | 21.6305 22.1922 |

-continued

| INGREDIENTS %<br>(by weight) | 18° Proof<br>MARGARITA |
|---|---|
| *CMC-7LF | .03848–.03869 |
| Citric Acid | .8245–.8291 |
| OTHER INGREDIENTS %<br>(by volume) | |
| Essential Oils | .01171 |
| PRODUCT SPECS. | |
| Specific Gravity | 1.087 ± .003 |
| pH | 2.5 ± 0.3 |
| Total Solids (°Brix) | 23.4 ± 0.5 |
| Total Acidity (gm/l) | 9.3 ± 0.3 |
| Lbs./Gal. | 9.046–0.096 |

*Sodium Carboxymethylcellulose, low viscosity, fine grind commercially available from Herculese Powder.

This product was packaged with the same plastic cup and lidding material as Example 5. After six months at 100° F., the product passed the taste test. This packaged product could be placed in a consumer freezer for six to eight hours to form an attractive soft ice which could readily be eaten with a spoon or spooned into a serving glass to form with stirring, a slush frozen cocktail. The plastic packaging was stable and safe in the freezer environment.

The invention has been described in considerable detail with reference to specific embodiments thereof. However, it will be recognized that various changes can be made from the invention as specifically described without departing from the spirit and scope of the invention as described in the foregoing specification and defined in the following claims.

What is claimed is:

1. A packaged alcoholic beverage comprising:
   a sealed container containing ana alcoholic beverage;
   the alcoholic beverage having a proof of at least about 10 and including as an essential taste component one or more essential oils in an amount sufficient to perceptibly enhance the flavor of the beverage;
   the container including an interior layer in contact with the alcoholic beverage and a second layer, the interior layer consisting essentially of polypropylene homopolymer, the polypropylene homopolymer being inert with respect to the alcoholic beverage and non-absorptive of the flavor enhancing essential oils, the second layer being located exterior to the inside layer and composed of an oxygen barrier polymer;
   the packages alcoholic beverage in single serving size having a substantial shelf life such that when stored at 100° F. for six months, the beverage has a substantially uniform taste throughout the six month period.

2. The packaged alcoholic beverage defined in claim 1 wherein the essential oil is a citrus essential oil.

3. The packaged alcoholic beverage defined in claim 2 wherein the alcoholic beverage has a proof of from about 15 to about 30.

4. The packaged alcoholic beverage defined in claim 3 wherein the alcoholic beverage contains citric acid and sugar.

5. The packaged alcoholic beverage defined in claim 1 wherein the essentially oil is present in an amount of less than about 0.1% by volume.

6. The packaged alcoholic beverage defined in claim 5 having size of less than about one liter.

7. The packaged alcoholic beverage defined in claim 6 having size of from about 4 to about 12 ounces.

8. The plastic packaged beverage defined in claim 6 wherein the beverage forms a soft ice or slush when placed in a freezer.

9. The packaged alcoholic beverage defined in claim 1 wherein the oxygen barrier polymer is ethylene vinyl alochol copolymer.

10. The packaged alcoholic beverage defined in claim 9 wherein the container includes an exterior layer composed of a polyolefin.

11. The packaged alcoholic beverage defined in claim 10 wherein the polyolefin exterior layer is polypropylene.

12. The packaged alcoholic beverage defined in claim 10 wherein the container is prepared by a vacuum thermoforming process.

13. The packaged alcoholic beverage defined in claim 12 wherein the interior polypropylene homopolymer layer exhibits substantial orientation and crystallinity.

14. The packaged alcoholic beverage defined in claim 13 wherein the essential oil is a citrus essential oil.

15. The packaged alcoholic beverage defined in claim 14 wherein the essential oil is present in an amount of less than about 0.1% by volume and wherein the alcoholic beverage has a proof ranging from about 15 to about 30.

16. The packaged alcoholic beverage defined in claim 15 wherein the size of the packaged beverage ranges from about 4 to about 12 ounces.

* * * * *